(12) United States Patent
Wu et al.

(10) Patent No.: US 7,450,209 B2
(45) Date of Patent: Nov. 11, 2008

(54) PIXEL STRUCTURE FOR LIQUID CRYSTAL DISPLAY

(75) Inventors: Zhao-Hui Wu, Taoyuan Hsien (TW);
Po-Sheng Shih, Taoyuan Hsien (TW);
Kei-Hsiung Yang, Taoyuan Hsien (TW)

(73) Assignee: Hannstar Display Corporation, Taipei (TW)

( * ) Notice: Subject to any disclaimer, the term of this patent is extended or adjusted under 35 U.S.C. 154(b) by 519 days.

(21) Appl. No.: 11/023,204

(22) Filed: Dec. 27, 2004

(65) Prior Publication Data

US 2005/0105035 A1    May 19, 2005

Related U.S. Application Data

(63) Continuation-in-part of application No. 10/936,752, filed on Sep. 9, 2004, now Pat. No. 7,349,052, and a continuation-in-part of application No. 10/672,906, filed on Sep. 25, 2003.

(30) Foreign Application Priority Data

Mar. 3, 2003  (TW) ............... 92104450 A
Mar. 3, 2004  (TW) ............... 93105642 A

(51) Int. Cl.
*G02F 1/1343* (2006.01)
(52) U.S. Cl. ....................... 349/139; 349/39
(58) Field of Classification Search ............ 349/38, 349/39, 139
See application file for complete search history.

(56) References Cited

U.S. PATENT DOCUMENTS 6,483,566 B2 * 11/2002 Youn et al. ................. 349/141
6,603,525 B2 *  8/2003 Yamakita et al. ........... 349/139

* cited by examiner

*Primary Examiner*—Richard H Kim
(74) *Attorney, Agent, or Firm*—Thomas, Kayden, Horstemeyer & Risley

(57) ABSTRACT

In accordance with the present invention, a mteal electrode or a common electrode line (both called as Vbias electrode) is built in the pixel region. Holes passing through the pixel electrode are formed in the positions corresponding to the mteal electrode or common electrode line (both called as Vbias electrode) so as to reduce the crosswise electrical field. The liquid crystal molecule in the whole pixel region is in a splay state.

12 Claims, 13 Drawing Sheets

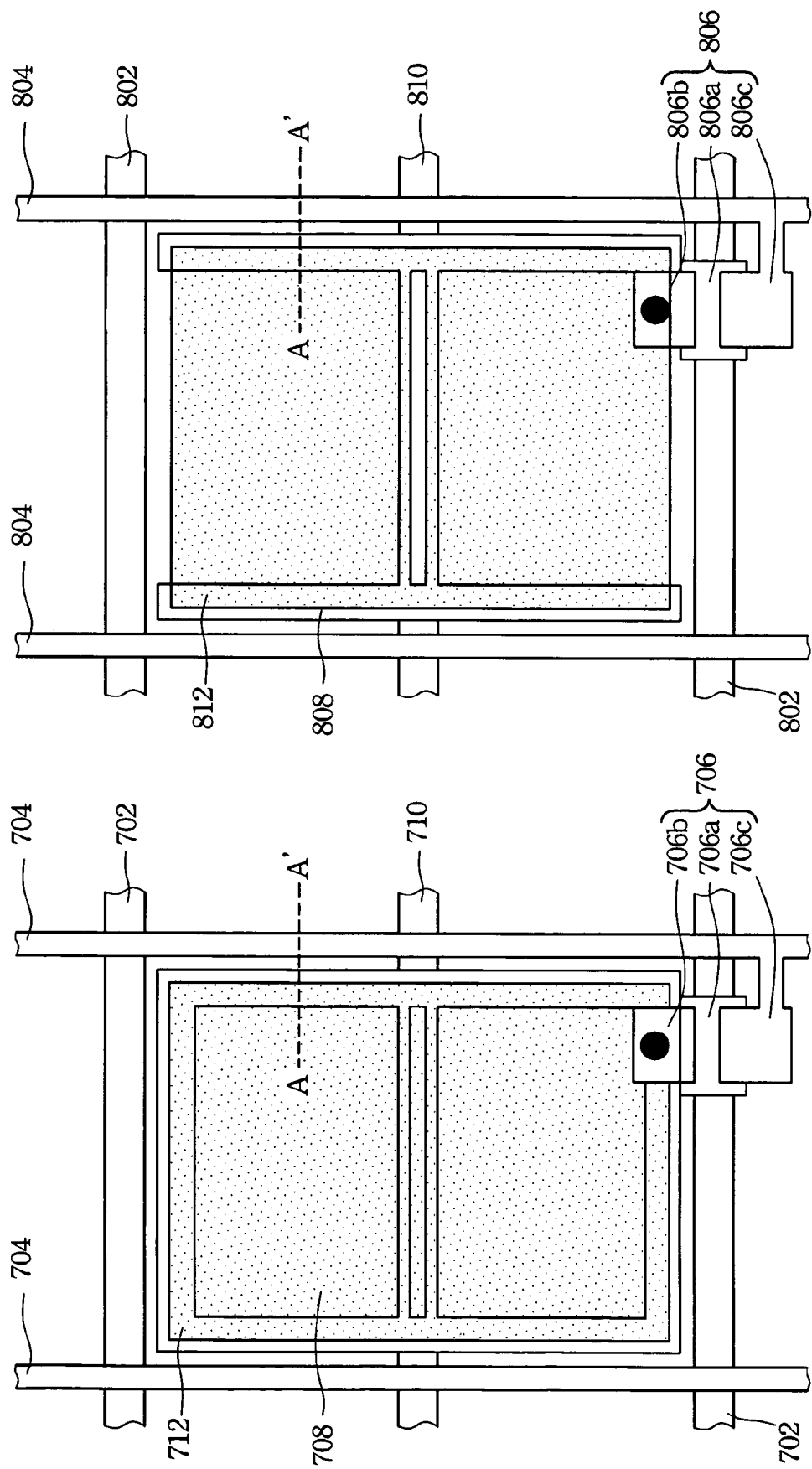

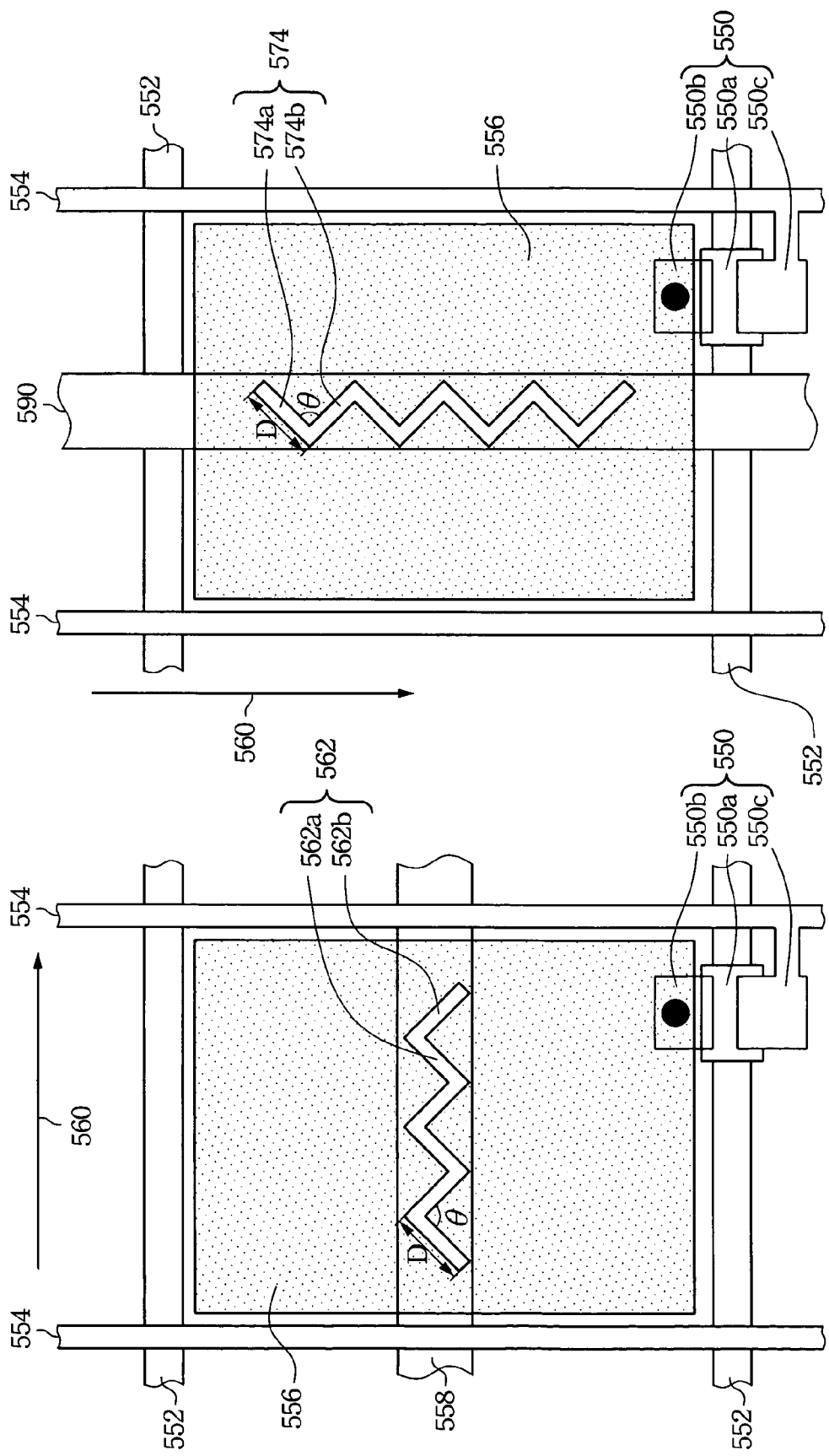

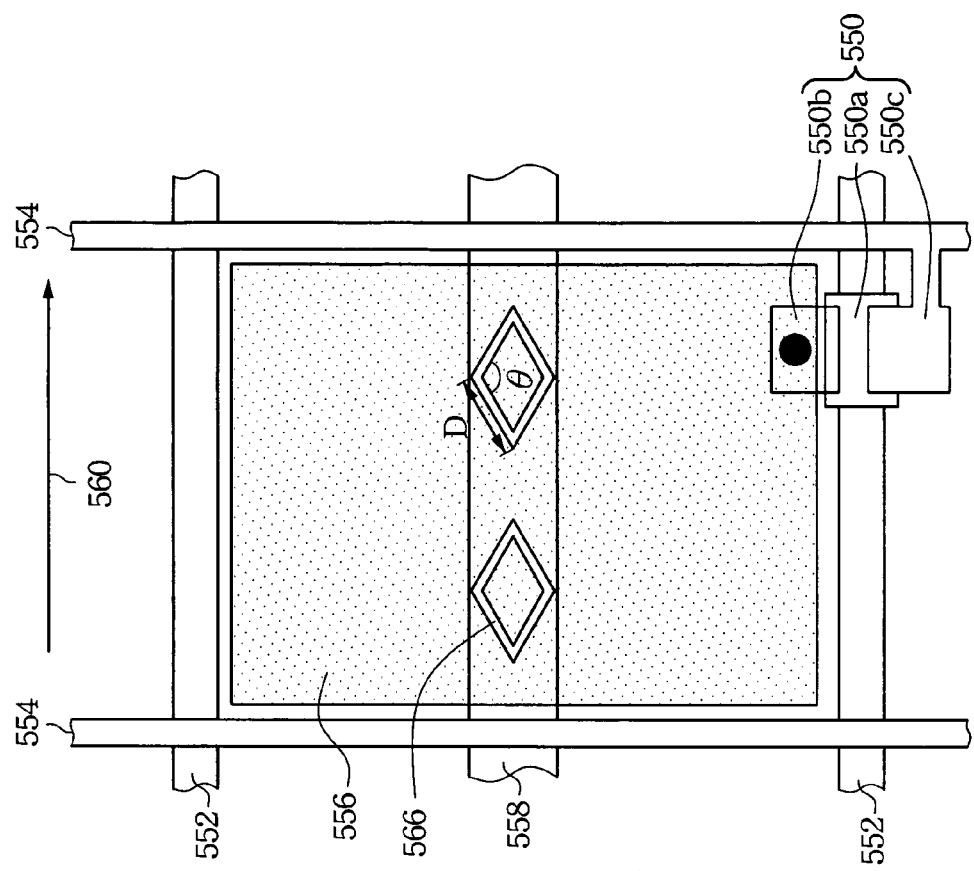
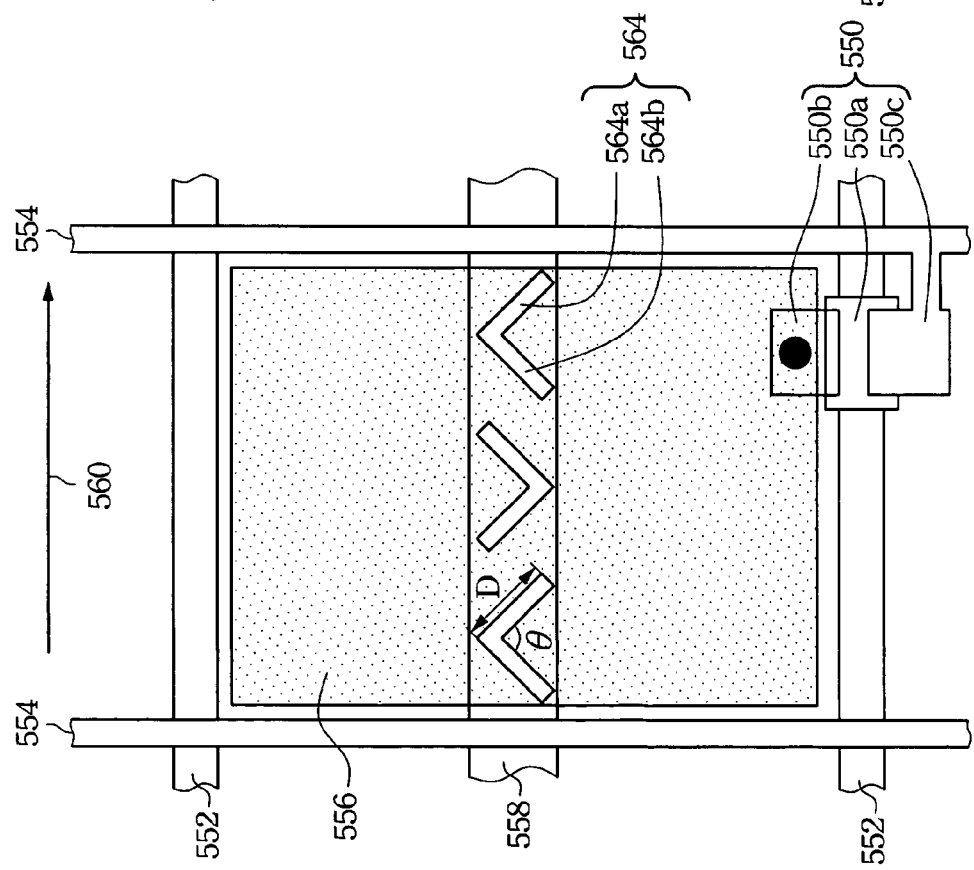
Fig. 9D
Fig. 9C

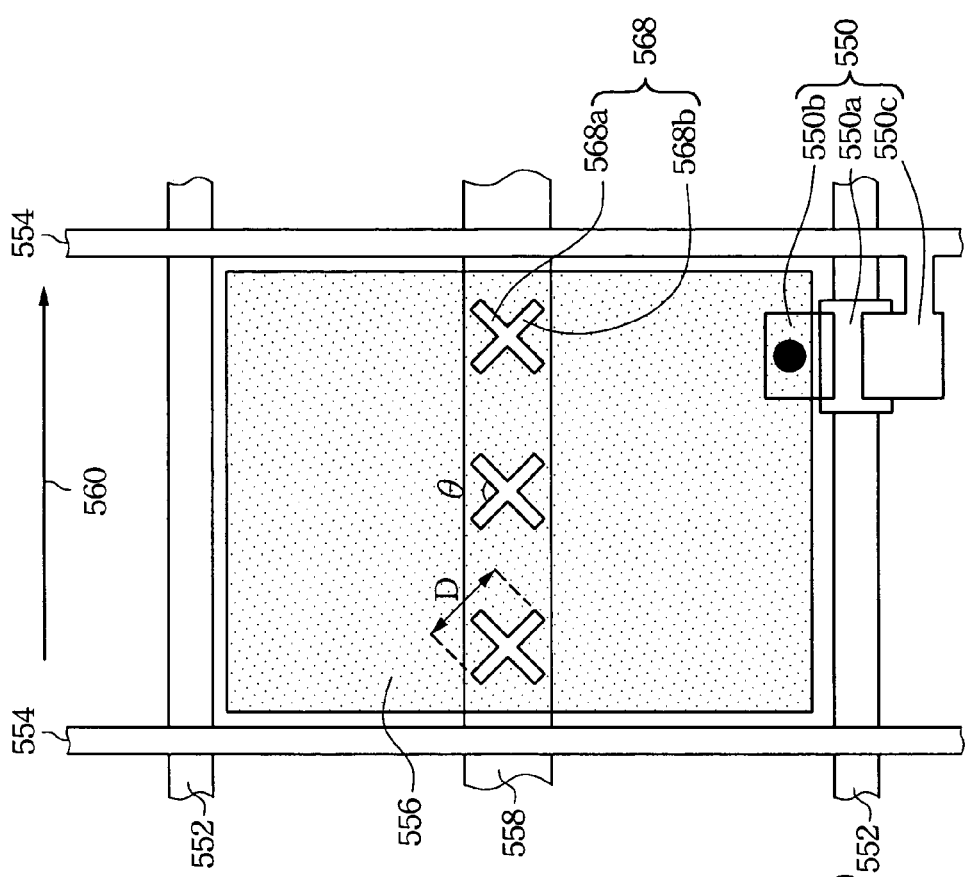
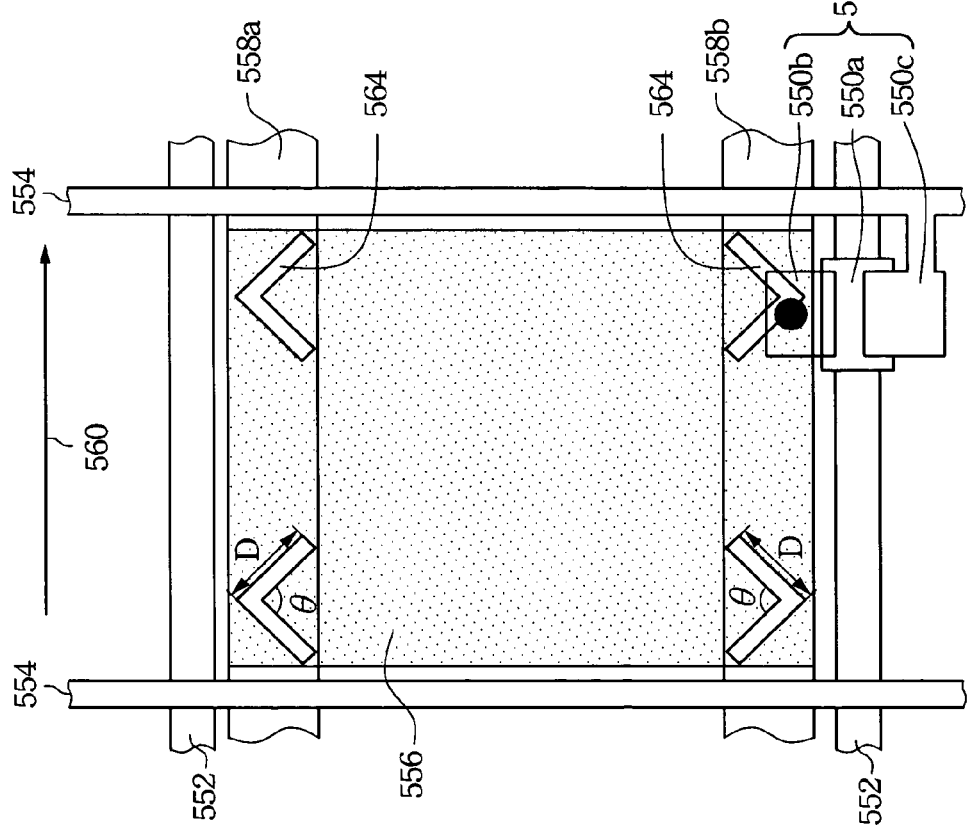
Fig. 9E
Fig. 9F

PIXEL STRUCTURE FOR LIQUID CRYSTAL DISPLAY

CROSS-REFERENCE TO RELATED APPLICATIONS

This application is a continuation-in-part of U.S. application Ser. No. 10/936,752, filed on Sep. 9, 2004 now U.S. Pat. No. 7,349,052, and also a continuation-in-part of U.S. application Ser. No. 10/672,906, filed on Sep. 25, 2003, hereby incorporated by reference as it fully set forth herein.

FIELD OF THE INVENTION

The present invention relates to a pixel structure for a liquid crystal display and more particularly to a high-speed response pixel structure for a liquid crystal display.

BACKGROUND OF THE INVENTION

In recent years, studies on an OCB cell that is to be used as a liquid crystal cell instead of a TN cell have been made. An OCB cell is in a splay orientation state when no bias voltage is applied thereto, and exhibits a bend orientation state when a given high voltage is applied thereto. And in the bend orientation state, top and bottom liquid crystal molecules are always oriented symmetrically, thus compensates for the birefringence of liquid crystal molecules so as to obtain the uniform viewing angle characteristic at all directions easily than with the orientation division method as well as a high-speed response characteristic that is one order faster than with conventional TN cells.

FIG. 1A shows a pixel structure plan diagram of a thin-film transistor LCD. The gate electrode 306a of the switch transistor 306 is connected to the scan line 302. The drain electrode 306b of the switch transistor 306 is connected to the pixel electrode 308 and the source electrode 306c is connected to the video data line 304. A common line 310 is used as the common electrode of the pixel electrode 308. The switch transistor 306 is usually a thin-film transistor (TFT) that is deposited on a transparent substrate such as glass. By scanning the scan lines 302 and in accordance with the scan signals, all of the switch transistors 306 in a given scan line 302 are turned on. At the same time, video signals are provided in the video data lines synchronously with the selected scan line 302.

FIG. 1B shows orientation state in accordance with the conventional method. The liquid crystal molecule 330 in the whole pixel is in splay state. In accordance with this method, a high voltage is applied between the conductor electrode 324 and the pixel electrode 308 for a given period at the start of operation of a liquid crystal display device using the OCB cell to transform the liquid crystal molecule 330 from splay state into the bend state. This fixed start time usually takes more than several tens of seconds. The liquid crystal molecule 330 returns to splay state when the LCDs is turned off. However, part of the liquid crystal molecule 330, such as the liquid crystal molecule between the video data line 304 and the pixel electrode 308, is applied to the high voltage and long duration in this mode, which causes two liquid crystal molecule states when the LCDs is turned on. Yet another problem is that even if the liquid crystal molecule 330 is transformed from splay orientation to bend orientation at the start of operation, the OCB cell may return to splay orientation during operation. The LCD must be restarted for display to return to normal.

On the other hand, recent battery-driven systems such as notebook-type personal computers equipped with a TFT color liquid crystal display device are increasingly required to be of a power-saving type. To conserve power, such a liquid crystal display device has a driving mode stop function to turn off a display thereof. Once the LCD is turned off, an OCB cell returns to splay orientation from bend orientation. A period of time is needed to restore the bend orientation state; thus the display cannot be turned on instantaneously.

SUMMARY OF THE INVENTION

In accordance with the foregoing description, it is the main object of the present invention to provide a pixel structure capable of obtaining a wide viewing angle as well as improving picture quality.

Another purpose of the present invention is to provide a pixel structure only using an unique orientation state in the whole cell and for which a given period at the start of operation of a liquid crystal display device is reduced to few seconds.

Yet another purpose of the present invention is to provide a driving method of a liquid crystal display device, which method allows an OCB cell to transform from a splay orientation to a bend orientation state in a short period.

In accordance with the present invention, a mteal electrode or a common electrode line (both called as Vbias electrode) is built in the pixel region. Holes passing through the pixel electrode are formed in the positions corresponding to the mteal electrode or common electrode line (both called as Vbias electrode) so as to reduce the crosswise electrical field. The liquid crystal molecules in the whole pixel region are in a splay state. A voltage is applied to the mteal electrode or common electrode line (both called as Vbias electrode) to transform the liquid crystal molecules over the mteal electrode or common electrode line (both called as Vbias electrode) from splay state into the bend state during during operation. Then, a voltage is applied to the pixel electrode. At this time, the liquid crystal molecules in the bend state transform the liquid crystal molecule over the pixel electrode from the splay state into the bend state. Therefore, the liquid crystal molecule in the whole pixel region exhibits the bend state.

The mteal electrode or common electrode line (both called as Vbias electrode) can be positioned in the center of the pixel electrode or around the pixel electrode in accordance with the present invention. A complicated manufacturing process can be avoided because the present invention does not require two orientation states in a liquid crystal cell. Moreover, a given period for transforming the liquid crystal molecule from the splay state into the bend state at the start of LCDs operation is reduced. Therefore, the LCDs using the pixel structure of the present invention exhibits a high speed response as well as a high display quality.

On the other hand, the present inveniton also provides a plurality of holes passing through the pixel electrode and formed in the positions corresponding to the mteal electrode or common electrode line (both called as Vbias electrode). Each hole is composed of a first opening arranged in a first direction and a second opening arranged in a second direction. The main purpose of forming these holes is to reduce the crosswise electrical field. The first opening and the second opening are connected together or are separated to each other. The liquid crystal molecule in the whole pixel region is in a splay state.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein:

FIG. 3-5 illustrate top views of the pixel region in accordance with some embodiment of the present invention;

FIG. 9A illustrates a schematic diagram of a pixel structure with a zigzag-shaped hole;

FIG. 9B illustrates a schematic diagram of a pixel structure with a zigzag-shaped hole;

FIG. 9C illustrates a schematic diagram of a pixel structure with a separate zigzag-shaped hole;

FIG. 9D illustrates a schematic diagram of a pixel structure with a frame-like shaped holes;

FIG. 9E illustrates a schematic diagram of a pixel structure with a separate zigzag-shaped hole;

FIG. 9F illustrates a schematic diagram of a pixel structure with a cross-shaped hole;

DETAILED DESCRIPTION OF THE PREFERRED EMBODIMENT

In accordance with the present invention, a mteal electrode or a common electrode line (both called as Vbias electrode) is built in the pixel region. The liquid crystal molecules in the entire pixel region are in the splay state. A voltage is applied to the mteal electrode or common electrode line (both called as Vbias electrode) to transform the liquid crystal molecules over the mteal electrode or common electrode line (both called as Vbias electrode) from the splay state into the bend state during operation. Then, a voltage is applied to the pixel electrode. At this time, the liquid crystal molecules in the bend state transform the liquid crystal molecule over the pixel electrode from the splay state into the bend state. Therefore, the liquid crystal molecules in the whole pixel region exhibit the bend state.

The First Embodiment

Figure 1A:
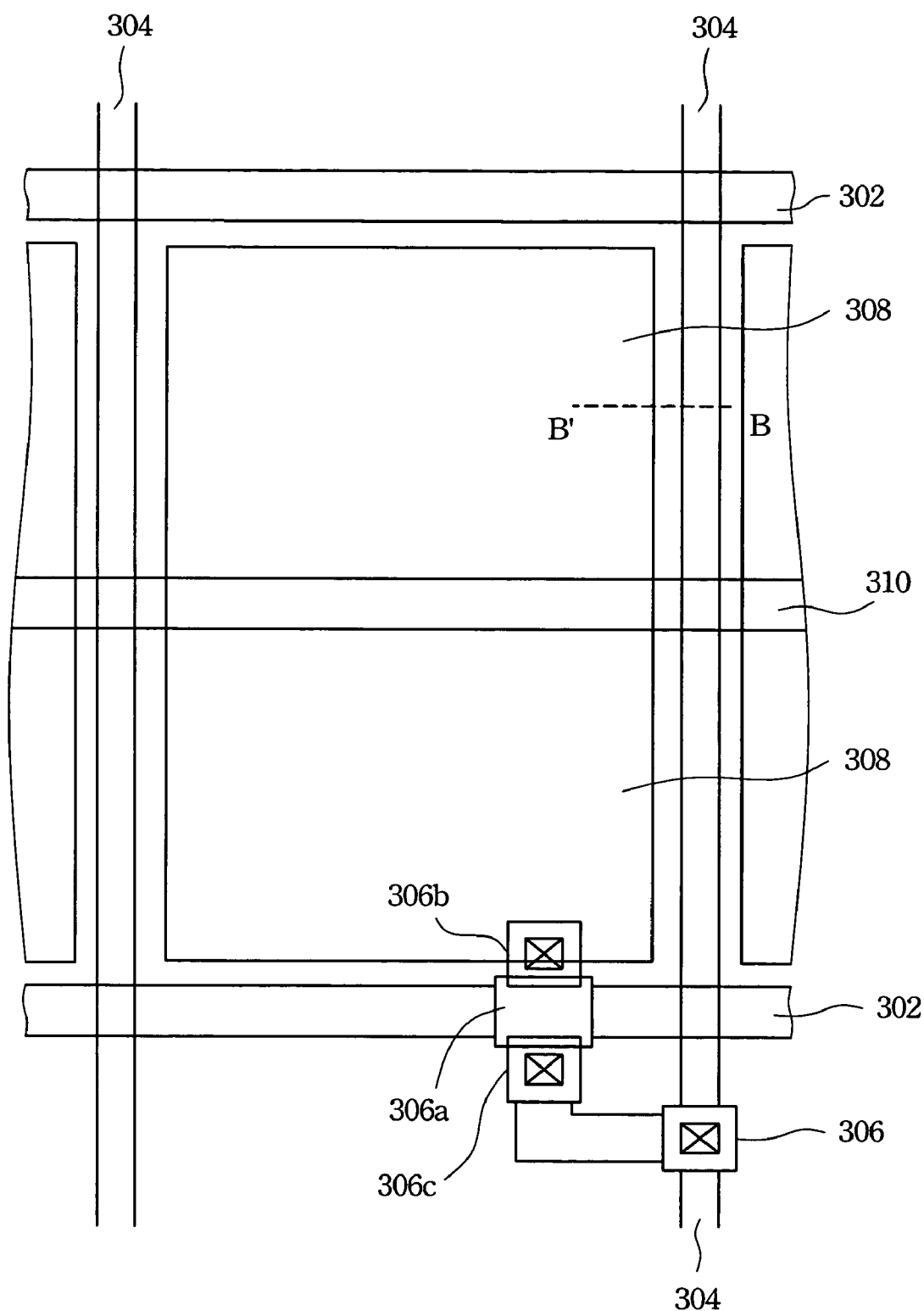
FIG. 1A illustrates a pixel structure plan diagram of a thin-film transistor LCD.
Figure 1B:
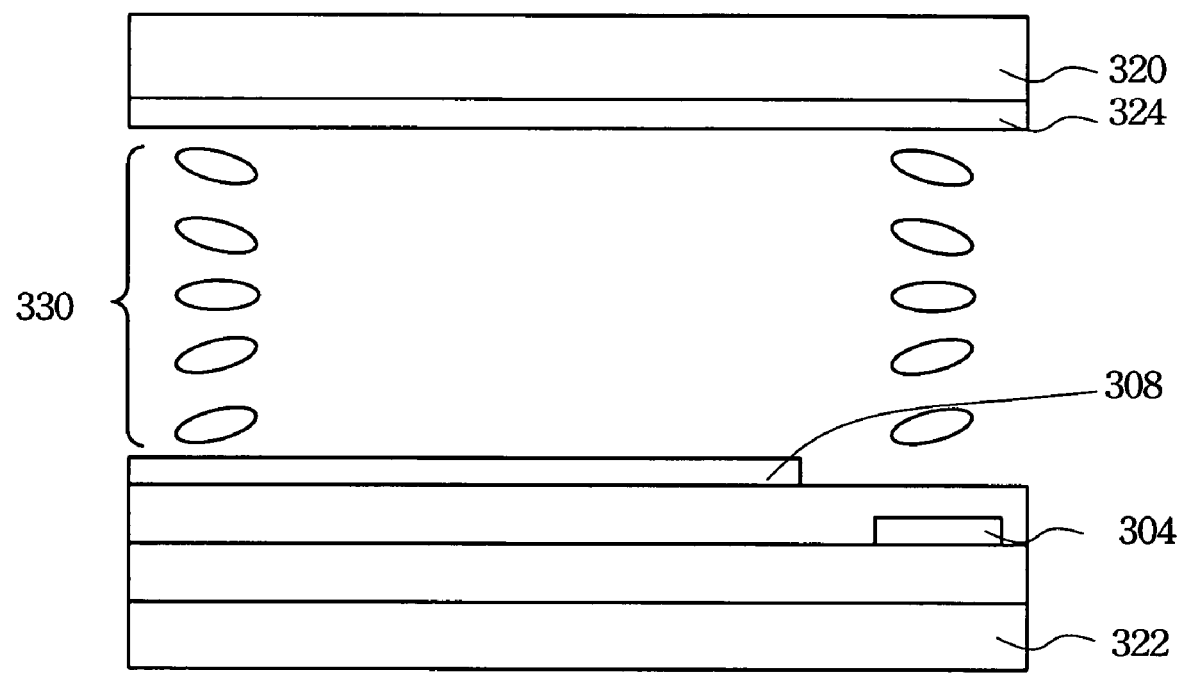
FIG. 1B illustrates a cross-sectional view along the BB' line of FIG. 1A, wherein all of the liquid crystal molecules are in the splay state.
Figures 2A, 2B:
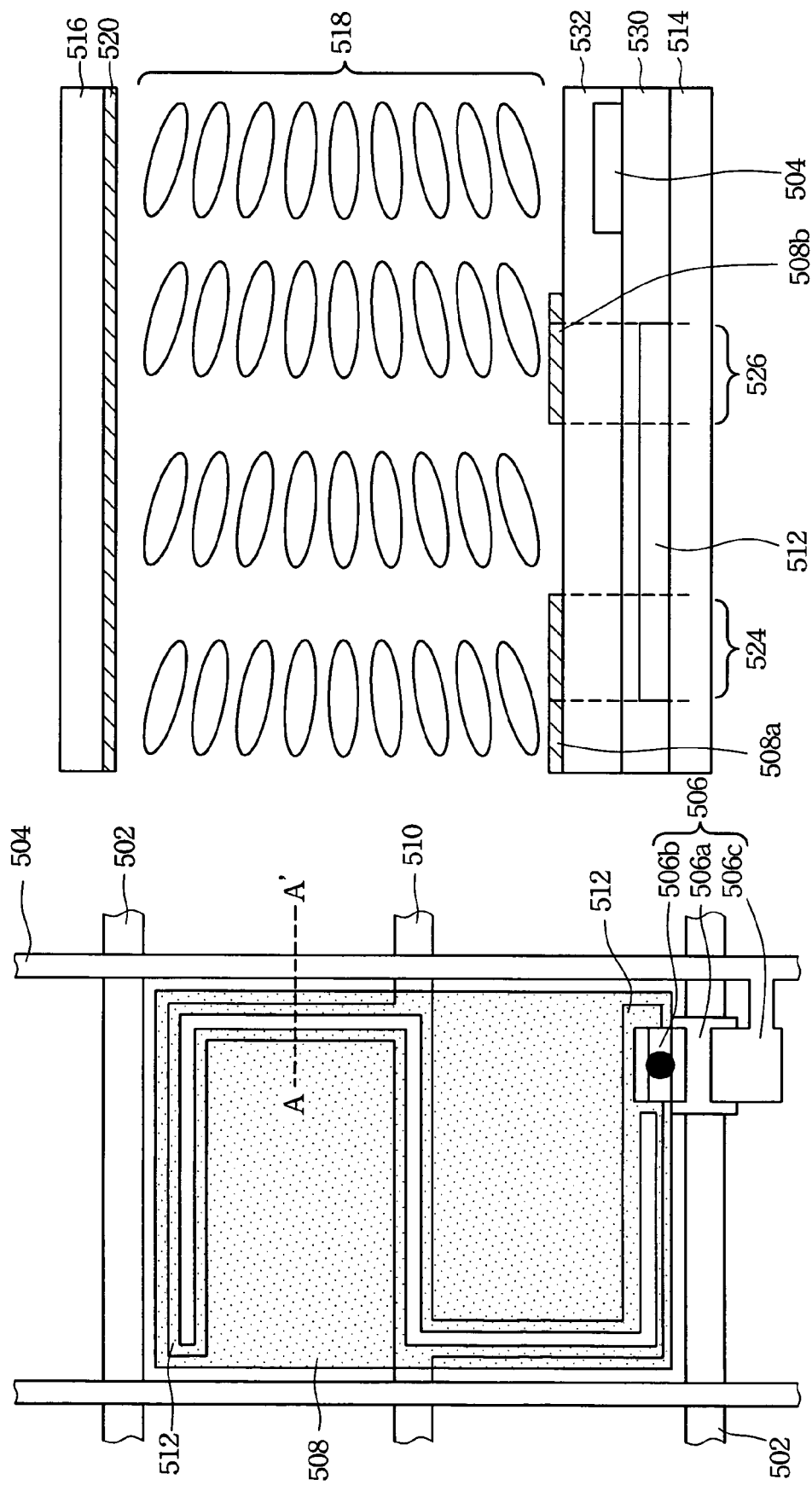
FIG. 2A illustrates a top view of the pixel region in accordance with the first embodiment of the present invention.
FIG. 2B illustrates a cross-sectional view from the AA' line of FIG. 2A, wherein all of the liquid crystal molecules are in the splay state.

FIG. 2A shows a top view of the pixel region in accordance with the first embodiment of the present invention. The silicon island 506a of the switch transistor 506 is connected to the scan line 502. When the switch transistor 506 is selected, a scan signal is sent via the scan line 502 to turn the switch transistor 506 on. The video signal in the video data line 504 is transferred to the pixel electrode 508 through the switch transistor 506. The drain electrode 506b of the switch transistor 506 is connected to the pixel electrode 508. The source electrode 506c of the switch transistor 506 is connected to the video data line 504. A common electrode line 510 is used as the common electrode of the pixel electrode 508. An "S"-type metal electrode 512 is built around the pixel region. The metal electrode 512 is controlled by the common electrode line 510.

Typically, the source electrode 506c and the drain electrode 506b of the switch transistor 506 can receive video data from the video data line 504. Therefore, by scanning the scan lines 502 and in accordance with the scan signals, the switch transistors 506 in a given scan line 502 are turned on. At the same time, video signals in the video data line 504 are transferred to the pixel electrode 508 through the switch transistor 506 to show a picture on the liquid crystal display.

FIG. 2B shows a cross-sectional view along line AA' of FIG. 2A, in which all of the liquid crystal molecules are in the splay state. A lower substrate 514 and an upper substrate 516 are opposite each other with a specific distance therebetween. The lower substrate 514 and the upper substrate 516 are preferably made of a transparent insulator. A liquid crystal layer 518 having a plurality of liquid crystal molecules is sandwiched between the lower substrate 514 and the upper substrate 516, in which the plurality of liquid crystal molecules is in the splay state. The video data line 504 and the metal line 512 are sequentially formed over the lower substrate 514. An isolation layer 530 is located between the video data line 504 and the metal line 512. A pixel electrode 508 is formed on the inner surface of the lower substrate 514. Another isolation layer 532 is located between the video data line 504 and the pixel electrode 508. A conductor electrode 520 is formed on an inner surface of the upper substrate 516. Both the pixel electrode 508 and the conductor electrode 520 are formed from a transparent conductor, such as materials of ITO, IZO, ITZO or AZO and so on. Further, alignment layers (not shown in figure) are formed on an inner surface of the lower substrate 514 whereon the pixel electrode 508 is disposed and the upper substrate 516 whereon the conductor electrode 520 is disposed. Herein, the alignment layers have a pre-tilt angle of about 5 degrees in the splay state.

Figure 2C:
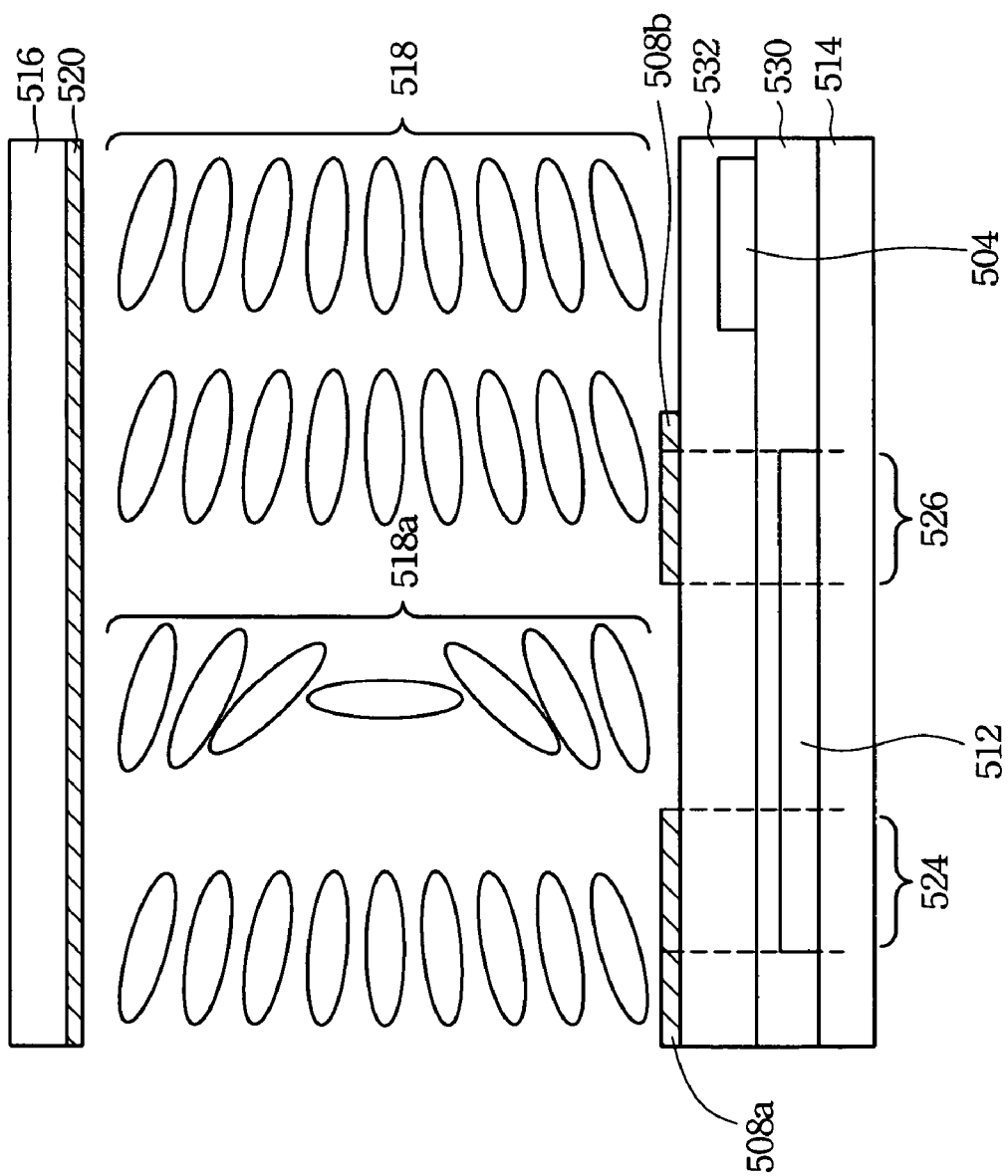
FIG. 2C illustrates a cross-sectional view from the AA' line of FIG. 2A, in which some of the liquid crystal molecules are transformed into the bend state.

A voltage is applied to the metal electrode 512 to transform the liquid crystal molecules over the metal electrode 512 from the splay state into the bend state during operation as shown in FIG. 2C. FIG. 2C shows a cross-sectional view along line AA' of FIG. 2A, in which parts of the liquid crystal molecules are transformed into the bend state. In accordance with the first embodiment, a voltage is applied between the common electrode 510 and the conductor electrode 520 located on the upper substrate 516. Therefore, a voltage difference also exists between the metal electrode 512 controlled by the common electrode 510 and the conductor electrode 520. Therefore, the liquid crystal molecules between the metal electrode and the upper substrate 516 are transformed from splay state into bend state due to the voltage difference.

Further reference is made to FIG. 2C. The pixel electrode 508 is divided into two parts, 508a and 508b. Liquid crystal molecules 518a in bend state is used to divide the two parts 508a and 508b. It is noted that these liquid crystal molecules 518a have an isolating function. The voltage difference between the metal electrode 512 and the conductor electrode 520 still exists after the voltage difference between the pixel electrode and the conductor electrode 520 is created. In other words, this still-existing voltage difference ensures that the liquid crystal molecules 518a remain in the bend state. Therefore, the liquid crystal molecules 518a isolate influence from outside of the pixel electrode in which the liquid crystal molecules are in a splay state. When the liquid crystal display is turned off, the voltage applied to the common electrode 510 is removed. At this time, the liquid crystal molecule between the common electrodes 510 and the metal electrode 512 are transformed from the bend state into the splay state.

Reference is made to FIG. 2A again. During operation, the liquid crystal molecules between the common electrode 510 and the metal electrode 512 are first transformed from the original splay state into the bend state before a voltage is applied to pixel electrode 508. Next, by scanning the scan lines 502 and in accordance with the scan signals, the switch transistor 506 in a given scan line 502 is turned on. At the same time, video signals in the video data line 504 are transferred to the pixel electrode 508 through the switch transistor 506. In other words, a voltage difference is created between the pixel electrode 508 and the conductor electrode 520 in the upper substrate 516. At this time, the liquid crystal molecules in the pixel region are transformed from the splay state into the bend state. Therefore, the liquid crystal molecules in the whole liquid crystal region are in the bend state. On the other hand, part of the metal electrode 512 may overlap with the pixel electrode 508. The overlapping part then functions as a capacitor, which raises the response velocity of the pixel electrode. The same operation method is used in the following embodiments.

Figure 5:
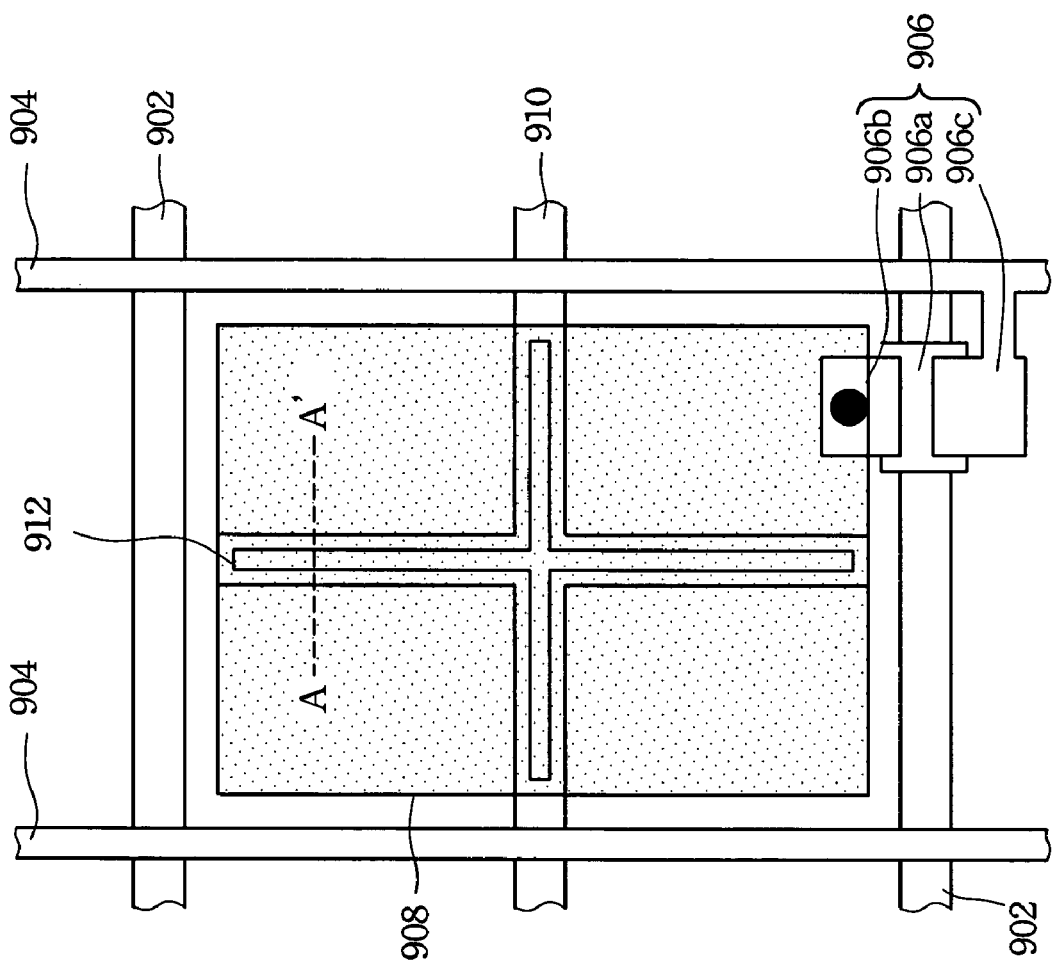

Furthermore, FIG. 3-FIG. 5 introduce various pixel structures with differert shaped common electrode, for example, a "B", an H, and a cross shape. Based on a top view of the pixel region of the present invention as shown in FIG. 3, a metal electrode 712 is built around the pixel region and controlled by the common electrode line 710.

And in accordance with FIG. 4 and FIG. 5, the metal electrode 812 and the common electrode 810 are in the shape of an "H", and the metal electrode 912 and the common electrode 910 are in the shape of a cross, wherein the metal electrodes are controlled by the common electrode line.

It is noted that the common electrode line with the connected metal electrode line and the video data line are located on different layers according to the foregoing embodiments. However, the common electrode line with the connected metal electrode line and the video data line can be located on the same layer in another embodiments. For example, FIG. 6A and FIG. 6B illustrate the structure of the common electrode line with the connected metal electrode line and the video data line, described in the first embodiment, are located on the same layer.

Figures 6A, 6B:
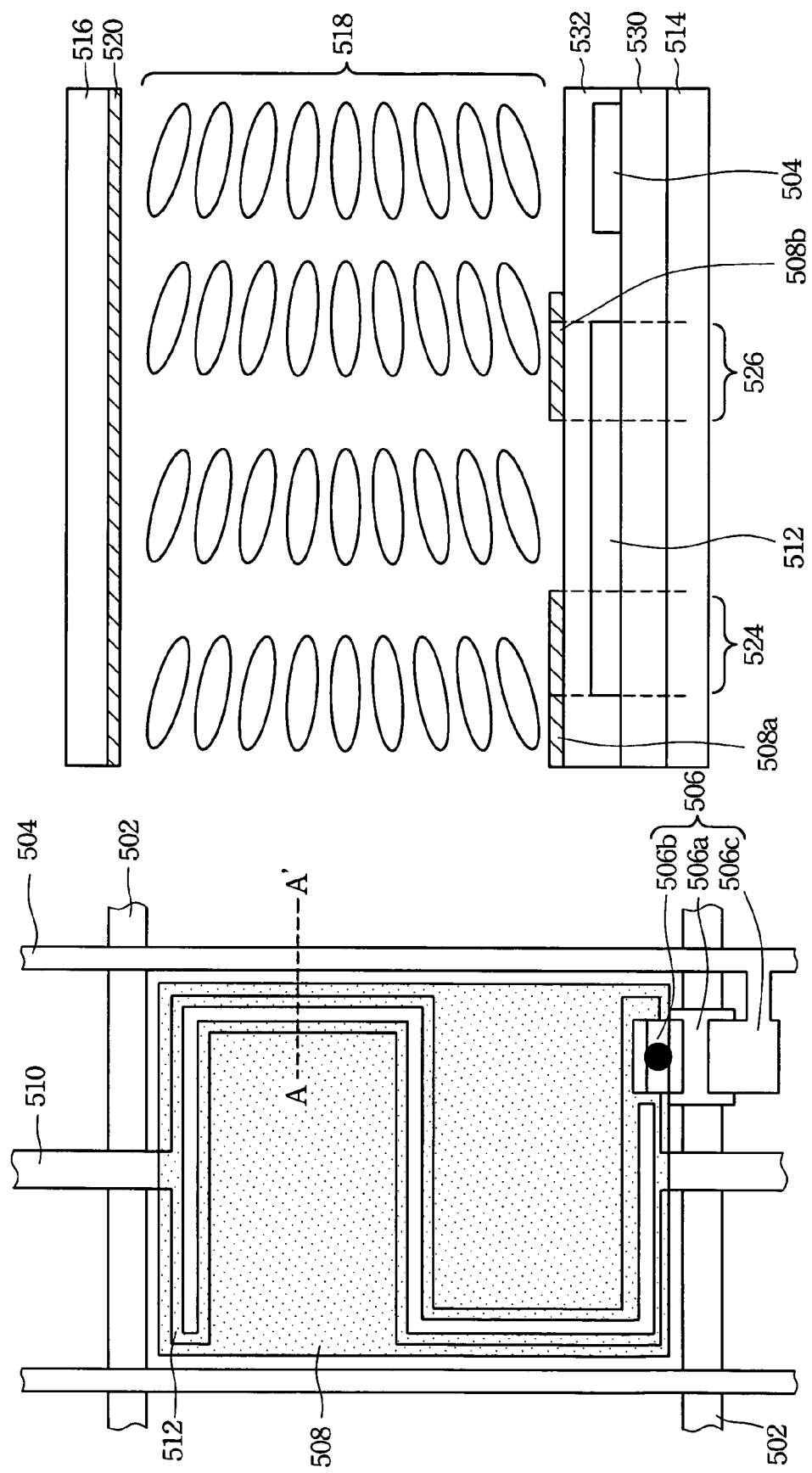
FIG. 6A illustrates a top view of a pixel region that the common electrode line with connected metal line and the video data line are arranged in the same layer.
FIG. 6B illustrates a cross-sectional view from the AA' line of FIG. 7A, in which some of the liquid crystal molecules are transformed into the bend state.

FIG. 6B shows a cross-sectional view along line AA' of FIG. 6A, in which all of the liquid crystal molecules are in the splay state. A lower substrate 514 and an upper substrate 516 are opposite each other with a specific distance therebetween. The lower substrate 514 and the upper substrate 516 are preferably made of a transparent insulator. A liquid crystal layer 518 having a plurality of liquid crystal molecules is sandwiched between the lower substrate 514 and the upper substrate 516, in which the plurality of liquid crystal molecules are in the splay state. The video data line 504 and the metal line 512 are formed over the lower substrate 514 and located on the same layer but isolated from each other. A pixel electrode 508 is formed on the inner surface of the lower substrate 514. Another isolation layer 532 is located between the video data line 504, the metal line 512 and the pixel electrode 508. A conductor electrode 520 is formed on an inner surface of the upper substrate 516. Both the pixel electrode 508 and the conductor electrode 520 are formed from a transparent conductor, and preferably, for example, a material of ITO, IZO, ITZO or AZO.

The structure of the common electrode line with the connected metal line and the video data line are located on the same layer also can be applied in the foregoing embodiments.

And it is noted that the metal electrode can be positioned in the center of the pixel electrode or around the pixel electrode. The metal electrode and the common electrode can be in the shape of a cross, in the shape of an "S", in the shape of a "B" or in the shape of an "H".

In accordance with the present invention, a complicated manufacturing process is avoided because the present invention does not require two orientation states in a liquid crystal cell. Moreover, a given period for transforming the liquid crystal molecule from the splay state into the bend state at the start of LCDs operation is reduced. Therefore, the LCDs using the pixel structure of the present invention has a high-speed response as well as a high display quality On the other hand, the liquid crystal molecules filling the pixel region need be aligned. The alignment arranges the orientation of the liquid crystal molecules before a field is applied to the liquid crystal display to sure all the liquid crystal molecules are arranged in the same direction. A rubbing method is used to arrange the orientation. An orientation line is generated on the orientation layer during the rubbing process. These liquid crystal molecules are oriented along these lines.

In accordance with the present invention, when a voltage is applied to the common electrode, an unwanted crosswise fileld is also generated around the common electrode. This crosswise electrical field affects the transformation of the liquid crystal molecules located around the electrode. Therefore, the present invention provides an alignment method to reduce the effect the crosswise electrical field.

Figure 7A:
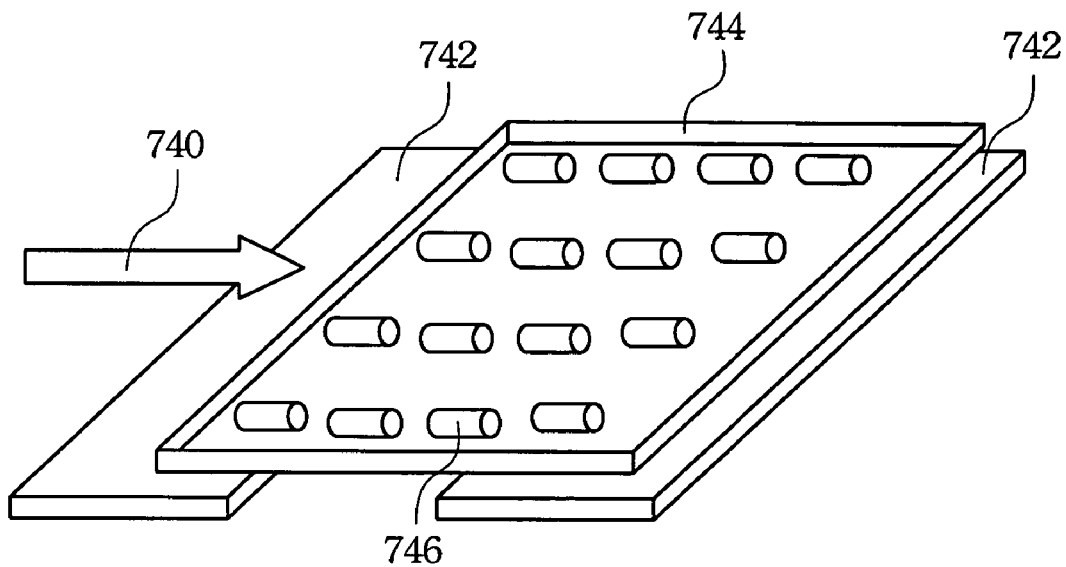
FIG. 7A illustrates a schematic diagram of the liquid crystal molecules aligned in the direction perpendicular to the metal electrode.

FIG. 7A illustrates a schematic diagram of the liquid crystal molecules aligned in the direction perpendicular to the metal electrode. The liquid crystal molecules 746 located over the metal electrode 742 and the pixel electrode 744 are aligned in the direction as indicated by the arrow 740 perpendicular to the metal electrode 742. In FIG. 4, the metal electrode 812 is built around the pixel electrode. Therefore, according to the alignment method illustrated in FIG. 7A, the liquid crystal molecules 818 located over the metal electrode 812 and the pixel electrode are aligned in the direction perpendicular to the metal electrode 812.

Figure 7B:
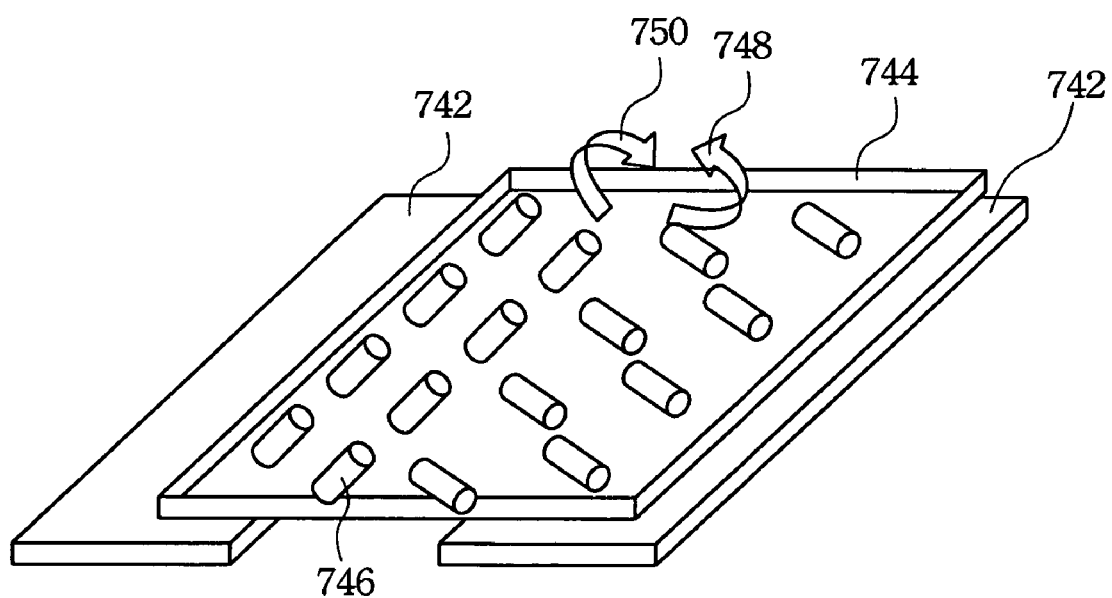
FIG. 7B illustrates a schematic diagram of the liquid crystal molecules affected by a crosswise electrical field.

FIG. 7B illustrates a schematic diagram of the liquid crystal molecules affected by a crosswise electrical field. When a voltage is applied to a pixel electrode 744, a crosswise electrical field 750 is generated, the direction of which is the reverse of the direction of the electrical field 748 used to transform the liquid crystal molecules 746. In other words, a larger voltage must be applied to the pixel electrode 744 to overcome the crosswise electrical field so as to finish the transformation of the liquid crystal molecules 746. Such a larger voltage requirement consumes power and time to finish the transformation of the liquid crystal molecules.

Figure 8A:
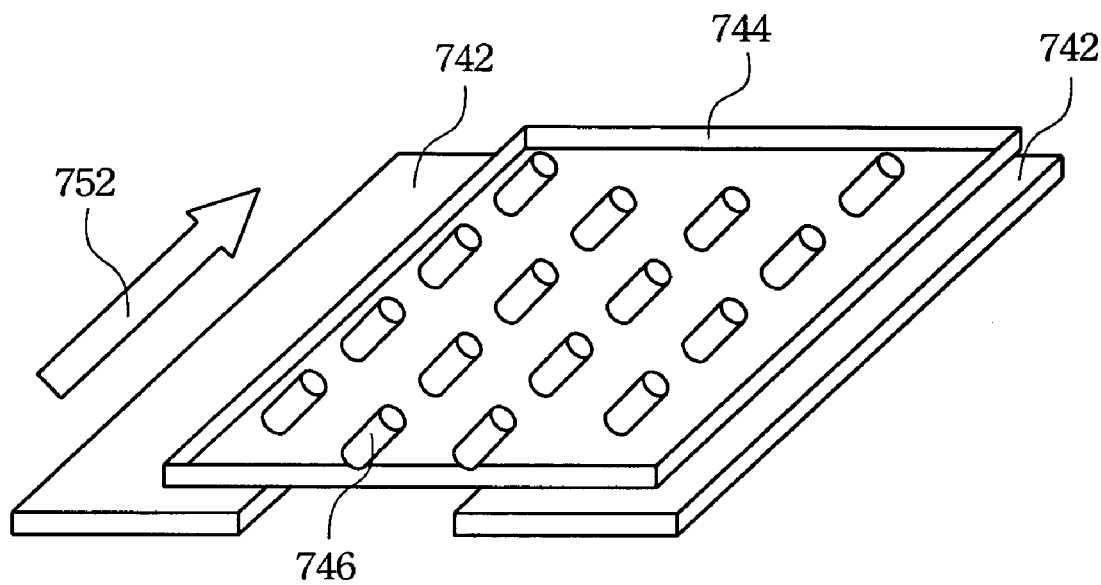
FIG. 8A illustrates a schematic diagram of the liquid crystal molecules aligned in the direction parallel to the metal electrode.

In FIG. 8A, illustrates a schematic diagram of the liquid crystal molecules that is aligned in the direction parallel to the metal electrode. The liquid crystal molecules 746 located over the metal electrode 742 and the pixel electrode 744 are aligned in the direction as indicated by the arrow 752 that is parallel to the metal electrode 742. In FIG. 4, the metal electrode 812 is built around the pixel electrode. Therefore, according to the alignment method as shown in FIG. 8A, the liquid crystal molecules 818 located over the metal electrode 812 and the pixel electrode are aligned in the direction parallel to the metal electrode 812.

Figure 8B:
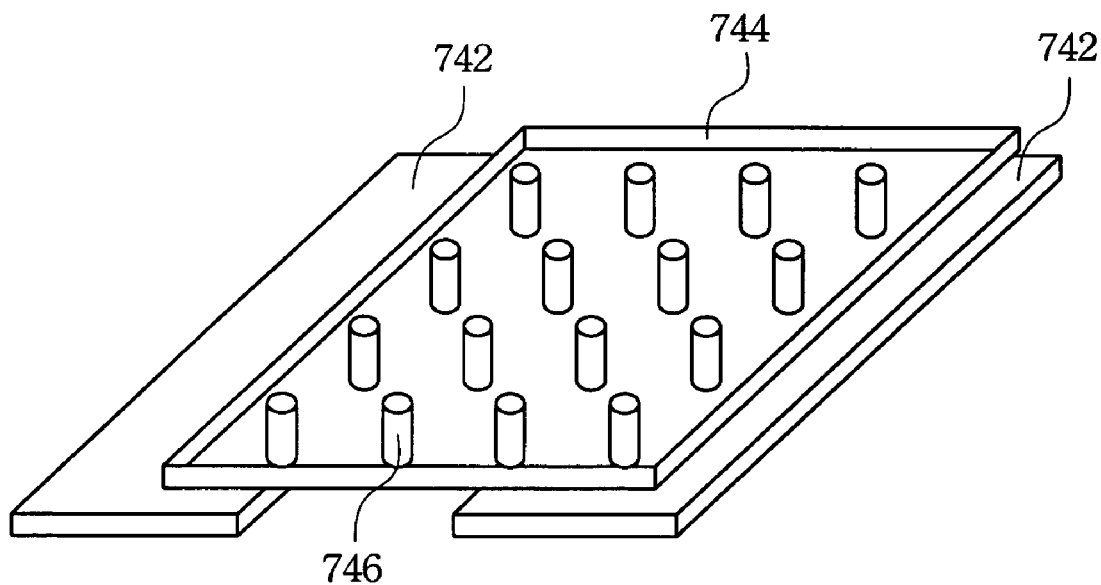
FIG. 8B illustrates a schematic diagram of the liquid crystal molecules affected by a crosswise electrical field.

FIG. 8B illustrates a schematic diagram of the transformation of the liquid crystal molecules when a voltage is applied to a pixel electrode 744. The alignment direction of the liquid crystal molecules 746 is parallel to the arrangement direction of the the metal electrode 742 in FIG. 8A. Therefore, the crosswise electrical field generated by the metal electrode 742 does not obstruct the liquid crystal molecules transformation. In other words, it is not necessary to apply a larger voltage to the pixel electrode 744 to overcome the obstruction of the crosswise electrical field.

Accordingly, the alignment direction of the liquid crystal molecules in the foregoing embodiments is parallel to the arranged direction of the metal electrode. However, the arranged direction of the metal electrode is not always in the same direction in a pixel region in the embodiments, which causes disorder in the liquid crystal molecule alignment direction in a pixel region. For solving this problem, The metal electrode is designed and additional holes passing through the pixel electrode are formed in positions corresponding to the metal electrode or common electrode so as to reduce the effect of the crosswise electrical field and improve the transmission efficiency.

The following embodiments illustrate to form holes to pass through the pixel electrode and are formed in the positions corresponding to the common electrode or the metal electrode so as to reduce the crosswise electrical field. The following paragraphs describe these structures according to the preferred embodiments. It is noted that the metal lines are not shown in the the drawings of the following embodiments. Any metal line structure as described in the foregoing embodiments can be connected to the common electrode line. These drawings only depict the hole structure for exposing part of the common electrode line. However, the same hole structure also can be formed in the positions of the metal electrode to pass through the pixel electrode for exposing part of the metal electrode. In the following embodiments, the alignment direction of the crystal molecule is parallel to the common electrode.

The Second Embodiment

FIG. 9A illustrates a schematic diagram of a pixel structure, in which a zigzag-shaped hole according to preferred embodiment is formed in the pixel electrode for exposing part of the common electrode line. The silicon island 550a of the switch transistor 550 is connected to the scan line 552. When the switch transistor 550 is selected, a scan signal is sent via the scan line 552 to turn the switch transistor 550 on. The video signal in the video data line 554 is transferred to the pixel electrode 556 through the switch transistor 550. The drain electrode 550b of the switch transistor 550 is connected to the pixel electrode 556. The source electrode 550c of the switch transistor 550 is connected to the video data line 554. When operating the liquid crystal display, a voltage is applied to a common electrode 558. Cooperating with the alignment direction of the liquid crystal molecules as indicated by the arrow 560, a continuous zigzag-shaped hole 562 in the pixel region 556 is over the common electrode line 558. The continuous zigzag-shaped hole 562 passes through the pixel electrode 556 for exposing part of the common electrode line 558. The hole 562 is formed by two kinds of holes 562a and 562b that have different arrangement directions. And the different arrangement directions have an included angle θ that is formed 30 to 160 degree, more preferably 70 to 110 degree. The holes 562a and 562b are arranged in series to form a continuous zigzag-shaped hole 562 over the common electrode line 558. And the dimension D of the hole is about 5-50 um, more preferably 5 to 20 um for zigzag-shaped hole.

It is noted that the common electrode line and the video data line are located on different layers according to the foregoing embodiment. However, using a hole for exposing partial common line also can be implemented in a pixel structure in which the common electrode line and the video data line are located on the same layer. For example, FIG. 9B illustrates one of the structures where the common electrode line 590 and the video data line 554 are located on the same layer.

In FIG. 9B, a continuous zigzag-shaped hole 574 is formed in the pixel electrode for exposing part of the common electrode line 590. The continuous zigzag-shaped hole 574 passes through the pixel electrode 556 for exposing part of the common electrode line 590. The hole 574 is formed by two kinds of holes 574a and 574b that have different arrangement directions. Similarly, the different arrangement directions have an included angle θ that is formed 30 to 160 degree, more preferably 70 to 110 degree. The holes 574a and 574b are arranged in series to form a continuous zigzag-shaped hole 574 over the common electrode line 558. And the dimension D of the hole is about 5-50 um, more preferably 5 to 20 um for zigzag-shaped hole. In other words, the structure of using a hole for exposing partial common line to reduce the crosswise electrical field can be used in the pixel structure in which the common electrode line and the video data line are located on the same layer or different layer.

And based on the two above preferred embodiments, further describe different hole shaped of a pixel structure for exposing part of the common electrode line; wherein the hole-shaped comprises serpentine shape, zigzag shape, crank-like shape, wave shape, frame-like shape, and cross-like shape and so on as shown in FIG. 9C to FIG. 9H. And the hole is formed by two kinds of holes that have different arrangement directions, wherein the different arrangement directions have an included angle θ that is formed 30 to 160 degree, and more preferably is 70~110 degree. Moreover, the dimension D of each hole is about 5-50 um.

FIG. 9C illustrates a schematic diagram of a pixel structure, in which a separate zigzag-shaped hole is formed in the pixel electrode for exposing part of the common electrode line. The separate zigzag-shaped holes 564 in a pixel region 556 are arranged over the common electrode line 558 and separate from each other by a fixed distance. Each isolated zigzag-shaped hole 564 passes through the pixel electrode 556 for exposing part of the common electrode line 558. Each isolated zigzag-shaped hole 564 includes two holes 564a and 564b that have different arrangement directions and are connected at a common point where an included angle is formed. The two included angles of any two adjacent zigzag-shaped holes 564 face opposite directions, respectively.

FIG. 9D illustrates a schematic diagram of a pixel structure, in which a frame-like shaped hole is formed in the pixel electrode for exposing part of the common electrode line. The frame-like shaped holes 566 in a pixel region 556 are arranged over the common electrode line 558. Each frame-like shaped hole 566 is formed by two separate zigzag-shaped holes 564 as shown in FIG. 9C. The two zigzag-shaped holes 564 have included angles respectively facing opposite directions. Branches of the two separate zigzag-shaped holes 564 are connected together to form the frame-like shaped holes 566 such as diamond-shaped holes as shown in the FIG. 9D. The frame-like shaped hole 566 passes through the pixel electrode 556 for exposing part of the common electrode line 558.

FIG. 9E illustrates a schematic diagram of a pixel structure, in which a separate zigzag-shaped hole is formed in the pixel electrode for exposing part of the common electrode line. In the FIG. 9E, two common electrode lines 558a and 558b are formed in a pixel region.

The separate zigzag-shaped holes 564 in a pixel region 556 are respectively arranged over the common electrode lines 558a and 558b. The separate zigzag-shaped holes 564 pass through the pixel electrode 556 for respectively exposing part of common electrode lines 558a and 558b. The included angles of the separate zigzag-shaped holes 564 over the same common electrode line face the same direction. The included angles of the separate zigzag-shaped holes 564 over the different common electrode lines face opposite directions. In other words, the separate zigzag-shaped holes 564 over the same common electrode have the same appearance. The separate zigzag-shaped holes 564 over the different common electrode are opposite in appearance. Therefore, the separate zigzag-shaped holes 564 respectively over the different common electrodes are symmetrical to the middle line of the pixel region.

FIG. 9F illustrates a schematic diagram of a pixel structure, in which a cross-shaped hole s formed in the pixel electrode for exposing part of the common electrode line. Many cross-shaped holes 568 in a pixel region 556 are arranged over the common electrode line 558. Each cross-shaped hole 568 is formed by two crossing holes 568a and 568b that have different arrangement directions. The cross-shaped hole 568 passes through the pixel electrode 556 for exposing part of common electrode line 558.

Figure 9H:
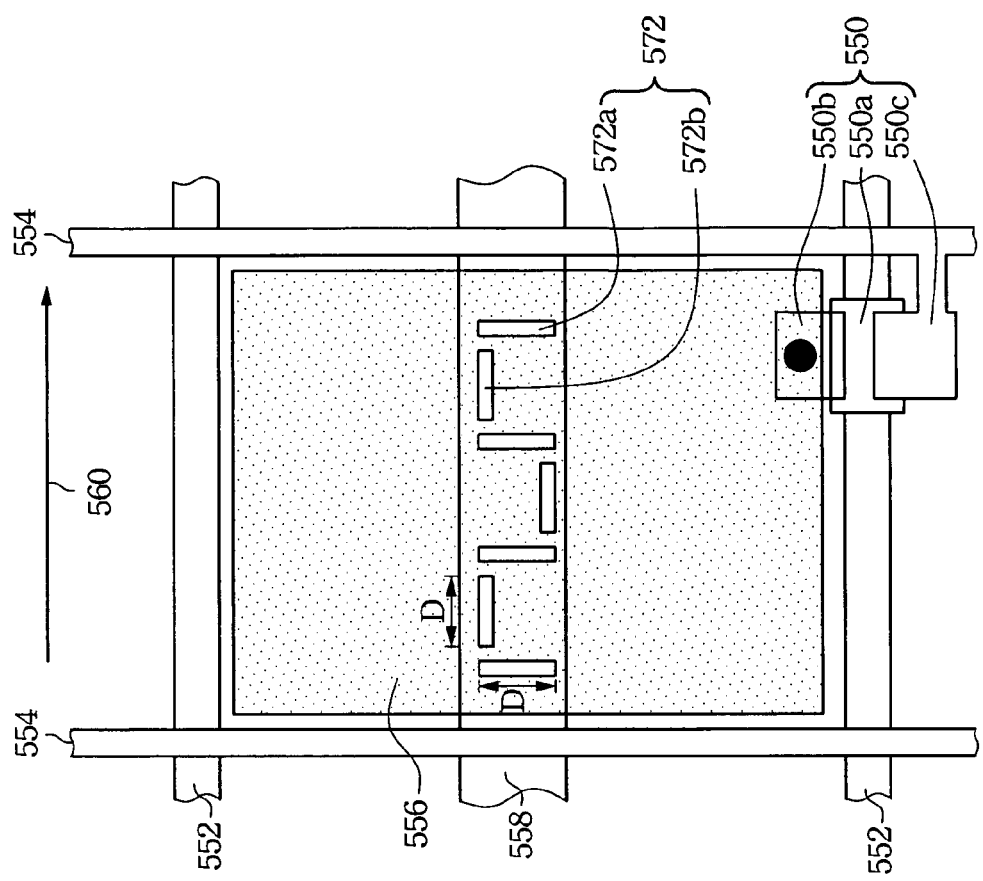
FIG. 9H illustrates a schematic diagram of a pixel structure with holes arranged in a crank-shaped.
Figure 9G:
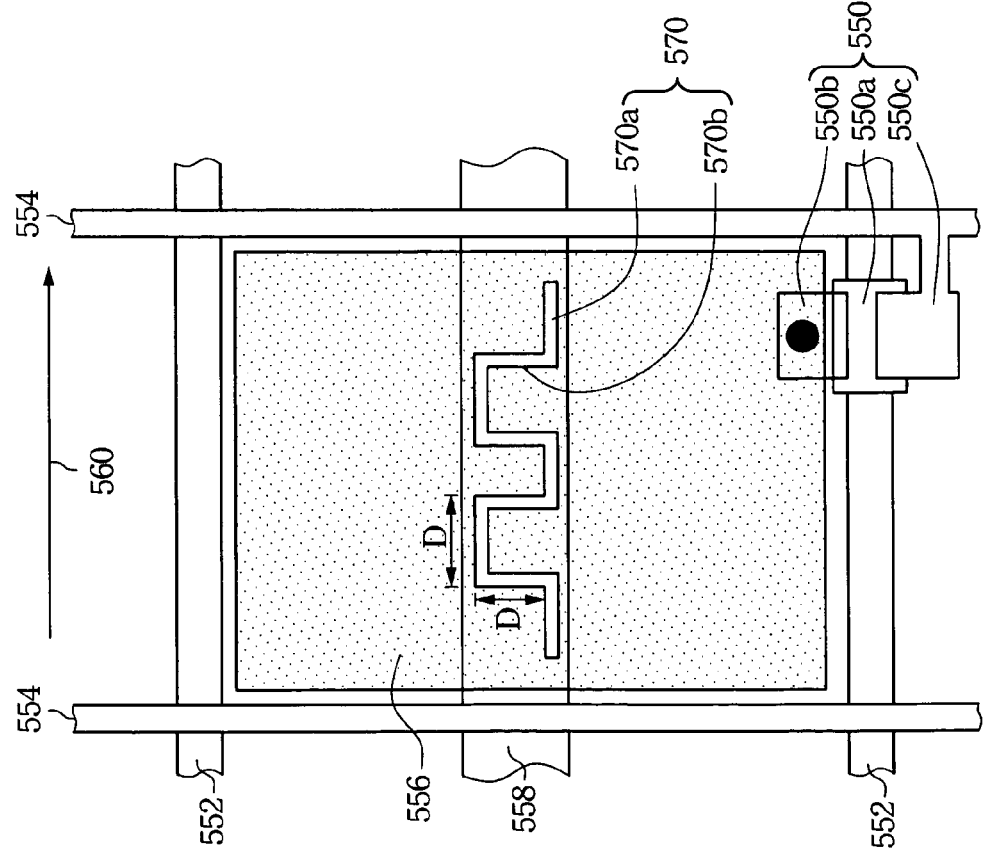
FIG. 9G illustrates a schematic diagram of a pixel structure with a crank-shaped hole.

FIG. 9G illustrates a schematic diagram of a pixel structure, in which a crank-shaped hole is formed in the pixel electrode for exposing part of the common electrode line. A continuous crank-shaped hole 570 in the pixel region 556 is over the common electrode line 558. The crank-shaped hole 570 passes through the pixel electrode 556 for exposing part of common electrode line 558. The hole 570 is formed by two kinds of holes 570a and 570b that have different arrangement directions, wherein an included angle θ between the different arrangement directions is 30 to 160 degree, more preferably 70 to 110 degree. The holes 570a and 570b are arranged in series to form a continuous crank-shaped hole 570 over the common electrode line 558. And the dimension D of the hole is about 5-50 um, more preferably 35 to 45 um for crank-shaped hole.

Except that, another kind crank-shaped hole 572 is shown as FIG. 9H, Two kinds of holes 572a and 572b are formed in a separate crank shape and over common electrode line 558 to pass through the pixel electrode 556 for exposing part of common electrode line 558. And the holes 572a and 572b have different arrangement directions.

It is noted that alothough FIG. 9C to FIG. 9H are related to the structure of the common electrode line and the video data line located on different layers, these embodiments also can be used in the structure where the common electrode line and the video data line are located on the same layer.

Accordingly, for reducing the crosswise electrical field effect during liquid crystal molecules transformation, additional holes passing through the pixel electrode are formed in the positions corresponding to the common electrode so as to reduce the crosswise electrical field.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A liquid crystal display, comprising:
a first substrate;
a scan line located on said first substrate;
a video data line arranged cross said scan line;
a pixel electrode located on said first substrate and having a first opening and a second opening;
a Vbias electrode corresponding to said first opening and said second opening, wherein an angle is between said first opening and said second opening, wherein said video data line and said Vbias electrode are located in a same layer;
a second substrate corresponding to the first substrate;
a conductor electrode located on the second substrate; and
a plurality of liquid crystal molecules disposed between the first and the second substrate and transformed from splay state to bend state by a voltage difference, wherein the voltage difference controlled by the Vbias electrode and the conductor electrode.

2. The liquid crystal display of claim 1, wherein said Vbias electrode is opaque.

3. The liquid crystal display of claim 1, wherein said first opening and said second opening are arranged to form a serpentine shape.

4. The liquid crystal display of claim 1, wherein said first opening and said second opening are arranged to form a zigzag shape.

5. The liquid crystal display of claim 1, wherein said angle is between 30-160 degree.

6. The liquid crystal display of claim 1, wherein the dimension of each opening is about 5-50 um.

7. A liquid crystal display, comprising:
a first substrate;
a scan line located on said first substrate;
a video data line arranged cross said scan line;
a pixel electrode located on said first substrate and having a first opening and a second opening; and
a Vbias electrode corresponding to said first opening and said second opening, wherein an angle is between said first opening and said second opening, and wherein said video data line and said Vbias electrode are located in a same layer.

8. The liquid crystal display of claim 7, wherein said Vbias electrode is opaque.

9. The liquid crystal display of claim 7, wherein said first opening and said second opening are arranged to form a serpentine shape.

10. The liquid crystal display of claim 7, wherein said first opening and said second opening are arranged to form a zigzag shape.

11. The liquid crystal display of claim 7, wherein said angle is between 30-160 degree.

12. The liquid crystal display of claim 7, wherein the dimension of each opening is about 5-50 um.

* * * * *